(12) United States Patent
Chiang et al.

(10) Patent No.: US 10,893,463 B2
(45) Date of Patent: Jan. 12, 2021

(54) INCREMENTAL QUERYING FOR NETWORK COVERAGE

(71) Applicant: T-Mobile USA, Inc., Bellevue, WA (US)

(72) Inventors: Hsin-Fu Henry Chiang, Bellevue, WA (US); Ming Shan Kwok, Seattle, WA (US); Jun Liu, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/279,553

(22) Filed: Feb. 19, 2019

(65) Prior Publication Data

US 2020/0267628 A1 Aug. 20, 2020

(51) Int. Cl.
| | |
|---|---|
| *H04L 12/28* | (2006.01) |
| *H04W 48/14* | (2009.01) |
| *H04W 8/20* | (2009.01) |
| *H04W 8/12* | (2009.01) |
| *H04W 84/04* | (2009.01) |

(52) U.S. Cl.
CPC ............ *H04W 48/14* (2013.01); *H04W 8/12* (2013.01); *H04W 8/20* (2013.01); *H04W 84/042* (2013.01)

(58) Field of Classification Search
CPC ....... H04W 24/00; H04W 48/16; H04W 4/00; H04W 52/0219; H04W 88/06; H04W 48/18; H04W 52/0241; H04W 36/32; H04W 36/36; H04W 48/20; H04W 4/24
See application file for complete search history.

(56) References Cited

U.S. PATENT DOCUMENTS

| | | | | |
|---|---|---|---|---|
| 7,233,805 B2* | 6/2007 | Choi | ........................ | H04W 8/00 455/522 |
| 8,369,234 B2* | 2/2013 | Ha | ........................ | H04W 48/16 370/252 |
| 2004/0253952 A1* | 12/2004 | Rager | ................... | H04W 48/16 455/432.1 |
| 2008/0194253 A1* | 8/2008 | Kuo | ........................ | H04W 48/16 455/433 |
| 2010/0020725 A1* | 1/2010 | Ha | ........................ | H04W 48/16 370/255 |

* cited by examiner

*Primary Examiner* — Phuc H Tran
(74) *Attorney, Agent, or Firm* — Lee & Hayes, P.C.

(57) ABSTRACT

Technologies for incrementally increasing a query timer value are described. When in a roaming mode, a user device is attached to a visited public land mobile network (VPLMN). The user device queries for a more preferred VPLMN or the home public land mobile network (HPLMN) to which the user device is subscribed. When the mobile device queries for a more preferred VPLMN or the HPLMN, if the mobile device does not detect a more preferred VPLMN or the HPLMN, the mobile device stays in roaming mode and increments a query timer value so the interval between a subsequent query operation and the currently performed query operation is greater than the interval between the currently performed query operation and a previously performed query operation. Upon attaching to an HPLMN, the query timer value may be reset.

18 Claims, 4 Drawing Sheets

INCREMENTAL QUERYING FOR NETWORK COVERAGE

BACKGROUND

Wireless communication networks are widely deployed to provide various communication services such as telephony, video, data, messaging, and broadcasts. Such networks, which are usually multiple access networks, support communications for multiple users by sharing the available network resources. A subscriber to wireless services may be associated with a subscriber profile. The subscriber's profile may be stored in association with a home public land mobile network (HPLMN), which simply may be a PLMN associated with a wireless service to which the subscriber has a relationship and/or subscription. A public land mobile network (PLMN) is a network that is operated by an administrator or a recognized operating agency (ROA) (which may both be referred to as an "operator") for the specific purpose of providing land and/or mobile telecommunication services to the public. Access to PLMN services may be achieved via an air interface involving radio communications between mobile phones and/or other wireless-enabled user equipment (UE) and land-based radio transmitters, radio base stations, and/or fiber optic networks.

As noted above, HPLMS's are typically operated by an entity to which the user of the UE is subscribed. For example, the user may have a monthly or yearly contract with a network operator (a cellular network company) that operates an HPLMN. However, in some instances, a user may travel to a location in which the cellular company (or other entity) does not have network coverage under the HPLMN. In these examples, the UE may be considered as "roaming," whereby communication coverage is not available with the HPLMN. To provide communication coverage, UE's are typically capable of radio access technology (RAT) scans. The UE may search for service on a RAT-by-RAT basis. First, the UE may perform a scan of a first RAT associated with a registered PLMN (RPLMN), or the most recent PLMN used by the UE. If a signal on which service may be acquired is found, the UE may register with the RPLMN. If not, the UE may enter a "roaming" mode, whereby the UE scans for network coverage from "foreign" networks, i.e. networks that are not operated by the subscribed to network, such as a visited PLMN (VPLMN). To allow for this, often network operators enter into roaming agreements with VPLMNs whereby non-subscribed UEs are permitted to use the foreign networks of the VPLMNs. Often, the contracts include revenue sharing, whereby a portion of the subscription profits paid by the user of the UE are provided to the foreign (or roaming) network operator. Further, VPLMN may not be able to provide a similar level or quality of services that may be provided by the HPLMN.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Described herein are technologies for incremental querying of public land mobile networks to reduce battery usage. In conventional technologies, if a mobile device (or UE) is in a roaming mode, whereby the mobile device is attached to a VPLMN, the mobile device may query for more preferred VPLMN or an HPLMN. The query typically occurs at consistent intervals when in roaming mode. For example, some mobile devices query every six (6) minutes, though the interval may be different for a particular network operator or mobile device manufacturer. In some examples, when querying, the mobile device can initiate an application that transmits a query signal. Cellular towers within range of the query signal respond to the signal, identifying the network operator as well providing other information that may allow the mobile device to attach to a particular cellular tower. Other technologies for querying may be used and are considered to be within the scope of the presently disclosed subject matter.

As a way to maximize revenue, among other reasons, UEs are typically programmed to continually scan for networks associated with the subscribed to network operator when the UE is using a roaming network. In some examples, networks may have preferred roaming networks. Thus, while in "roaming" mode, the UE may periodically transmit a query signal to determine if an HPLMN or a more preferred VPLMN is available. If an HPLMN or a more preferred VPLMN is available, the UE will switch from the roaming network to the HPLMN or the more preferred VPLMN. Further, a VPLMN may not provide the same services or similar quality of services that may be provided by an HPLMN. Thus, while providing some basic level of functionality, it may be preferable to attach the UE to a VPLMN that provides better service or the HPLMN. Thus, the functionality of the UE may benefit from attaching to a more preferred VPLMN or the HPLMN.

However, an issue with conventional technologies is that the amount of energy to conduct a single querying operation can roughly be the same as initiating a connection request and then disconnecting (i.e. making a phone call and then hanging up before being connected). While designed to attach the phone to a more preferred VPLMN or the HPLMN, the constant querying can act as a drain on the battery. This issue can be exacerbated by the fact that it occurs when the mobile device is roaming, indicating that the user in not in a familiar location in which access to a recharging power supply is readily available. This battery draining effect can most often be seen when travelling and the users see that the battery on their mobile device drains faster than normal. In some examples, the constant scanning coupled with location-based updates to various applications due to the movement of the mobile device, can cause battery drainage to be significant.

Constantly querying for a more preferred VPLMN or HPLMN can present various technical limitations. For example, querying for a more preferred VPLMN or HPLMN uses computing resources of the mobile device, and if the user has not moved appreciable since the commencement of the querying operation where there is an increased probability that the travel will result in the mobile device finding a more preferred VPLMN or HPLMN, the expenditure of energy and bandwidth to provide the computing resources to query are essentially unused or wasted. Further, as mentioned above, constantly querying, at relatively short time intervals, for a more preferred VPLMN or HPLMN can cause the battery of the mobile device to drain at a much faster rate than how the battery would drain during normal use. This drainage, along with other potential problems inflicted on the battery itself, can, if fully drained, leave the user without the use of a mobile device, often in an area that the user is not typically familiar with.

To alleviate some of the technical issues present in conventional art, various implementations of the present disclosure provide for varying query intervals. In some examples, when a mobile device is in a roaming mode and attached to (or using) a VPLMN, in an attempt to find a more preferred VPLMN or HPLMN, the mobile device commences the query operation. If the mobile device is unable to find a more preferred VPLMN or HPLMN, the interval of the query operations is increased an incremental amount. In some examples, the interval to the next query is incremented to a value twice of the base or first interval value. For example, initially a mobile device may query for a more preferred VPLMN or HPLMN in six (6) minute increments. According to various examples disclosed herein, if the mobile device does not receive information that a more preferred VPLMN or HPLMN is available, the next time in which the mobile device transmits a query may be twelve (12) minutes, or a doubling of the initial value. According to various examples disclosed herein, if the mobile device does not receive information that a more preferred VPLMN or HPLMN is available when the mobile device queries upon the twelve (12) minute timer, the next time in which the mobile device transmits a query may be twenty-four (24) minutes, or a doubling of the second value. The interval between queries may be doubled (or other increase) until a limit is reached. For example, the query intervals may be doubled until the interval between the queries reaches eight (8) hours. Once the maximum interval is reached, the phone may query at that value thereafter.

In some examples, the interval value may be reset or modified based on various factors. For example, if the mobile device query results in the mobile device attaching to a more preferred VPLMN or HPLMN, the interval value (the query timer value discussed below) may be reset to a reset value. In the examples in which the mobile device attaches to a more preferred VPLMN but not the HPLMN, the interval may be reset, may be maintained at the maximum value, or may be changed to another value between the minimum value and the maximum value. By incrementally increasing the interval value for the querying operation, as the mobile device stays in the roaming mode, the querying occurs at a decreasing rate. As can be understood, this reduction in the rate may both reduce the potential for wasted computing resources (e.g. reducing network congestion due to a reduction in querying operations) as well as reduce the rate of battery drainage caused by the querying operations. These and other improvements to the functioning of the mobile device are discussed herein.

Figure 1:
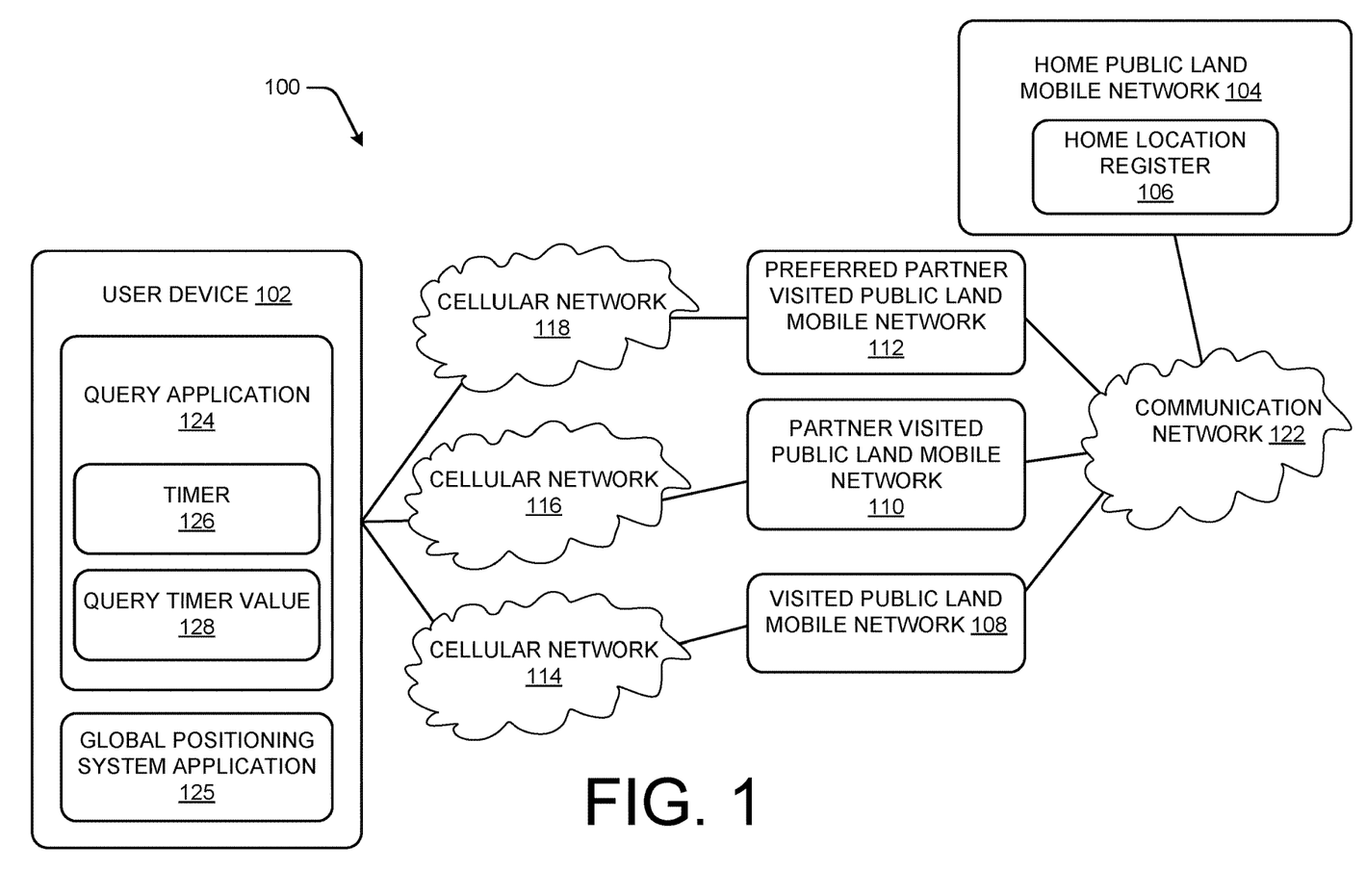
FIG. 1 illustrates an example operation environment for providing incremental querying for network coverage.

FIG. 1 illustrates an example operation environment 100 to provide incremental querying for network coverage. User device 102 may be a mobile device used by a user (not pictured), a computer, laptop, or the like. The user device 102 may be compatible with one or more types of communication networks, such as, but not limited to, Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN). In some examples, the communications networks described herein can include any network topologies including, but not limited to, 2G, 3G, 4G, 4G LTE, 5G, Wi-Fi, Bluetooth, Bluetooth Low Energy, and the like. In other examples, the communication network can be wired or wireless Internet Protocol-based networks capable of establishing communication with a communication services server.

In FIG. 1, the user device 102 is subscribed to a network operator (not shown) that owns or controls home public land mobile network (HPLMN) 104. In various examples, the HPLMN 104 may be considered the "home network" of the user device 102. To maintain a database of the subscribers to the HPLMN 104, the HPLMN 104 has stored therein home location register (HLR) 106. The Home Location Register (HLR) is a database of permanent or semi-permanent subscriber information for a mobile network. Maintained by the subscriber's home carrier (or the network operator where the user initiated the call), the HLR includes pertinent user information, including address, account status, and preferences. In some examples, the HLR 106 may be a function of, or replaced by, a home subscriber server. In some systems, a home subscriber server (HSS) is used in IMS, 4G, and 4G-LTE applications, whereas the HLR 106 is used in 2G and 3G applications. It should be understood that the presently disclosed subject matter is not limited to any particular network type, network evolution, or network standard.

If the user device 102 is not in an area covered by a cell tower controlled by the HPLMN 104, in order to provide service to a user operating the user device 102, the user device 102 may query and attach to a non-home PLMN. In the example illustrated in FIG. 1, networks that may be used by the user device 102 depending on the coverage include a VPLMN 108, a partner VPLMN 110, and a preferred partner VPLMN 112. Cellular network 114 is provided by the VPLMN 108. Cellular network 116 is provided by the partner VPLMN 110. Cellular network 118 is provided by preferred partner VPLMN 112.

As noted above, the network operator for the HPLMN 104 may enter into agreements with other PLMN's to provide coverage for their subscribers when not in the network of the HPLMN 104. In FIG. 1, the HPLMN 104 has entered into an agreement with the preferred partner VPLMN 112. In that instance, if the user device 102 is out of the network of the HPLMN 104 and the preferred partner VPLMN 112 is available, the user device 102 will preferable attach to the preferred partner VPLMN 112 over other, non-preferred partner VPLMNs. For example, if both the preferred partner VPLMN 112 and the partner VPLMN 110 are available for use, the user device 102 will preferable attach and use the preferred partner VPLMN 112. In a similar manner, the user device 102 will preferably attach to a preferred or partner VPLMN over other VPLMNs. For example, if the partner VPLMN 110 and the VPLMN 108 are available, and the HPLMN and the preferred partner VPLMN 112 are not, the user device will preferably attach to and use the partner VPLMN 110 over the VPLMN. In some examples, a contractual relationship may not exist specifically between the HPLMN 104 and a VPLMN, such as the VPLMN 108. In these examples, the VPLMN 108 may be part of an industry consortium or standard whereby, even though a contract does not exist, the VPLMN 108 agrees to provide coverage to the user device 102. This often happens in areas in which cellular companies are relatively new or largely unregulated. When the user device attaches to the VPLMN 108, the partner VPLMN 110, or the preferred partner VPLMN 112, the respective VPLMN communicates with the HPLMN 104 of the user device 102 to determine if the user device is authorized to be attached to the respective VPLMN. When contacted through the communication network 122, which may be an international communication network, the HPLMN 104 accesses the HLR 106 to determine subscriber status of the user device 102, then, if the user device 102 is authorized, transmits that information to the VPLMN so the VPLMN can attach the user device 102 to its service.

When the user device 102 is in a roaming mode and attaches to the VPLMN 108, the partner VPLMN 110, or the preferred partner VPLMN 112, the user device 102 may be programmed to query available PLMNs to determine if the user device 102 has moved into an area covered by the HPLMN 104 or an area covered by a more preferable PLMN than the PLMN the user device 102 is currently attached to. In order to do so, the user device 102 has a query application 124. The query application 124 may be part of a general operating system, another application, or an individual, standalone application. The query application 124 is configured to cause the user device 102 to transmit a query signal to determine the available network coverages. The networks that received the signal and are available for use transmit a response. The query application 124 determines if the user device 102 should switch to another network. For example, if the user device 102 is currently attached to the cellular network 114, but a response indicates that the cellular network 116, associated with the partner VPLMN 110 is available, the user device 102 may switch from the cellular network 114 to the cellular network 116. To do so, the query application 124 has a timer 126. The timer 126 provides a timing signal to the query application 124 to inform the query application 124 to transmit a query signal. The timer 126 may be part of a clock mechanism used by the user device 102 to control various operations or a separate function.

The timer 126 is used by the query application to determine when the next query signal is to be sent. In conventional technologies, the timing is typically set by the network operator to which the user device 102 is subscribed or is a program within the user device 102 as established when a user receives the user device 102 for use. According to various implementations described herein, the query application 124 has a query timer value 128. The query timer value 128 is a value within the function of the query application 124. In some examples, the query timer value 128 may be the set value used in conventional technologies. However, according to various implementations described herein, the query timer value 128 is modified based on the query operations performed by the query application. As the query application 124 instructs the user device 102 to query for network coverage, the query timer value 128 may be incremented a predetermined amount of time. In some examples, the value of incremental increase may be an integer increase, a fractional increase, or a resultant increase of the application of a mathematical formula on the query timer value 128.

For example, if the current query timer value 128 is 6 minutes, the query timer value 128 may be incremented by 2. In that example, the next query for network coverage may occur 12 minutes after the last query, rather than the original query timer value, or the prior 6 minutes. In another example, if the current query timer value 128 is 6 minutes, the query timer value 128 may be incremented by a whole number such as 10 minutes. In that example, the next query for network coverage may occur 16 minutes after the last query, rather than the original or prior 6 minutes. These and other types of determining an incremental number are considered to be within the scope of the present disclosure.

Various reasons for incrementing the query timer value 128 are discussed above. Some examples include reducing the use of computing resources and reducing battery drainage. There may be additional reasons for incrementing the query timer value 128. For example, if one or more of the initial queries indicates that the currently attached VPLMN is the only or most preferred VPLMN available, there may be a chance that the user having the user device 102 is not moving distances in which another, more preferred network may be available. Thus, to query at the same rate may essentially be viewed as detaching or disassociating the operation from the situation.

In some examples, the query timer value 128 may be incrementally increased up to a maximum value. For example, a maximum value may be 8 hours. Therefore, when incrementing the query timer value 128, the query timer value 128 may be incremented up to 8 hours. Additional queries after that will be timed to occur 8 hours after the prior query, according to the example provided. The maximum value may be changed or may be a set value, the present disclosure not being limited to any particular maximum value. Further, in some examples, a maximum value may not be introduced, allowing the query timer value 128 to be continually incremented.

In some examples, the query timer value 128 may be reset or reduced to a smaller value. For example, if after a query or other operation the user device 102 is handed over from the VPLMN 108 to the HPLMN 104, the query timer value 128 may be reset to the original value. This may be done for various reasons. For example, resetting the query timer value 128 may essentially reset the user device 102 to the default configuration or the original condition. In some examples, the query timer value 128 may be reset if the user device 102 loses coverage of all VPLMNs. For example, the user may travel to an area without any network coverage. In another example, the user may switch the user device 102 to "airplane mode," whereby the transceiver of the user device 102 is inoperable. In these and other examples, the user device 102 loses network coverage and it may be desirable to reset the query timer value 128 to a smaller value, or the original value. Further, the manner in which network coverage is lost may be used to determine how the query timer value 128 is reset. For example, the user device 102 may detect that network coverage is being lost and regained in small intervals, indicating spotty or sparse network coverage. In this example, the user device 102 may determine that there is a probability that the loss of coverage with the same VPLMN is temporary (for example, less than a particular time, such as 5 minutes) by detecting that each time the user device 102 has been disconnected from the VPLMN, the user device 102 is able to reattach to the VPLMN within a short period of time. In that example, it may be preferable to not reset the query timer value 128. In some examples, such as an initial attachment to a VPLMN after losing coverage with the HPLMN 104 or the initiation of Airplane Mode, the user device 102 may reset the query timer value 128 as those situations are not indicative of a temporary loss of coverage with the same VPLMN or HPLMN.

In some examples, the query timer value 128 may be adjusted based on user activity, such as movement. For example, the query application 124 may receive input from a global positioning system application 125 of the user device 102 that the user device 102 has not moved from a location to a predetermined distance within a period of time. For example, the global positioning system application 125 may determine that the user device 102 has not moved more than 10 feet within a twenty-four-hour period of time. The detection of non-movement may be received by the query application 124, resulting in an increase of the query timer value 128 above other incremental increases, such as those described above.

In other examples, the query application 124 may receive input from the global positioning system application 125 that the user device 102 has moved more than a predetermined distance in a predetermined period of time. In some examples, the movement may indicate an increased probability that the user has entered in an area covered by a more preferred VPLMN or the HPLMN. In this example, if the user device 102 has moved more than a predetermined distance in a predetermined period of time, the query timer value 128 may be decreased or reset to a default value, or another value as determined by the system. It should be understood that the presently disclosed subject matter is not limited to the use of global positioning systems, as other technologies may be used to determine location.

Figure 2:
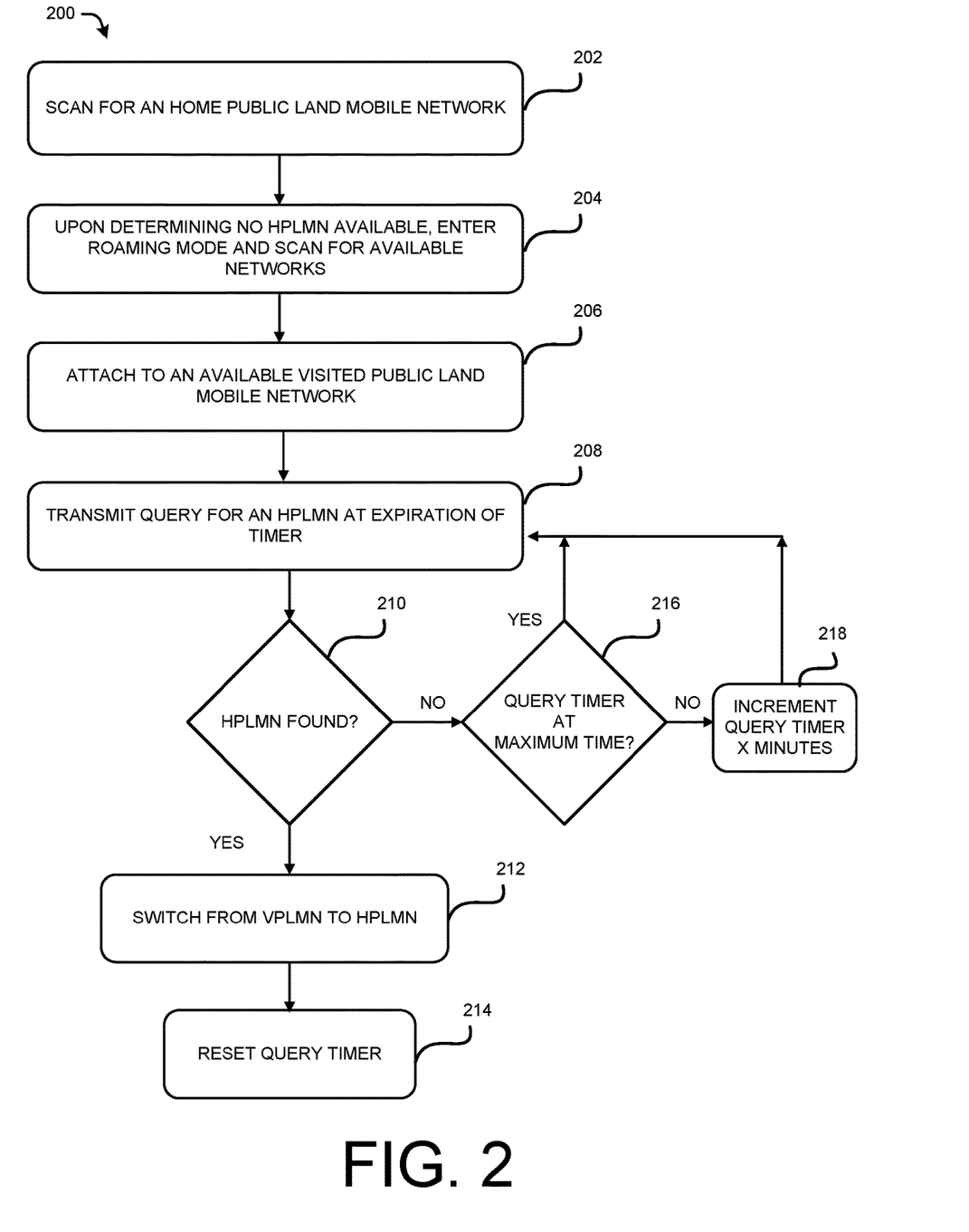
FIG. 2 is an illustrative process for providing incremental querying for network coverage.

FIG. 2 is an illustrative process 200 for providing incremental querying for network coverage. The process is illustrated as example flow graphs, each operation of which may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Referring to FIG. 2, the process 200 for providing incremental querying for network coverage commences at operation 202, where the user device 102 queries for the HPLMN 104. In some examples, the query operation commences, for example and not by way of limitation, when the user device 102 disconnects or detaches from the HPLMN 104 or the transceiver of the user device 102 powers on from a restart or from an airplane mode.

The process 200 continues to operation 204, where upon determining that the HPLMN 104 is not available, the user device 102 scans for available networks that may be used in a roaming mode. In some examples, the operations 202 and 204 occur substantially simultaneously (e.g. within technical limitations). For example, when querying for the HPLMN 104, the user device 102 can also receive response(s) from the preferred partner VPLMN 112, the partner VPLMN 110, and/or the VPLMN 108 indicating that one or more of those networks are available for use.

The process 200 continues to operation 206, where the user device 102 attaches to an available VPLMN, such as the preferred partner VPLMN 112, the partner VPLMN 110, and/or the VPLMN 108. In some examples, attaching to a VPLMN instead of the HPLMN 104 places the user device 102 in a roaming mode.

The process 200 continues to operation 208, where the user device 102 transmits a query for the HPLMN 104 at the expiration of the timer 126. In some examples, when placed in a roaming mode, the user device 102 will attempt to find and attach to the HPLMN 104. In order to determine if the HPLMN 104 is available after the user device 102 enters the roaming mode, the user device 102 initiates the query application 124. The query application 124 causes the user device 102 to transmit query signals at intervals to query if a more preferred VPLMN, the HPLMN 104, or another network that may be more preferred is available. The query application 124 uses the timer 126, which may be a timer used by the user device 102 for various operations.

The process 200 continues to operation 210, where a determination is made as to whether or not the HPLMN 104 is found after the query operation is performed by the query application 124. If the HPLMN 104 is found, the process 200 continues to operation 212, where the user device 102 switches (i.e. is handed over) from the VPLMN (such as the preferred partner VPLMN 112, the partner VPLMN 110, and/or the VPLMN 108) to the HPLMN 104. The process 200 continues to operation 214, where the query timer value 128 is reset. In some examples, the query timer value 128 is reset to a reset value, which can be an original or default value, or another value as discussed above in FIG. 1.

At operation 210, upon determining that the HPLMN 104 is not available, the process 200 continues to operation 216, where a determination is made as to whether or not the query timer value 128 is at a maximum value. As noted above in regard to FIG. 1, in order to provide various advantages and/or benefits over conventional technologies, when a querying operation is performed by the query application 124, the interval to the next querying operation is increased. This can, among other benefits and advantages, reduce the rate of battery drainage. It should be understood that the present subject matter does not require a query interval increase each time the query operation is performed. For example, the query timer value may be incrementally increased after each second, third, fourth, etc. query operation. Further, as discussed above, some examples do not use a maximum query timer value 128. In those examples, the query timer value 128 may be incrementally increased over time with no upper limit on the query timer value 128.

Upon determining at operation 216 that the query timer value 128 is at a maximum, the process 200 continues to operation 208, where at the expiration of the timer 126 for the current query timer value 128, a query is transmitted to determine if the HPLMN 104 is available. The incrementing of the query timer value 128 is ceased so that the query timer value 128 remains at the maximum value.

Upon determining at operation 216 that the query timer value 128 is not at a maximum, the process 200 continues to operation 218, where the query timer value 128 is incrementally increased a predetermined value. As noted above, the predetermined value may vary from application to application. For example, the query timer value 128 may be doubled each time the query operation is performed and no HPLMN 104 is found. In other examples, the query timer value 128 may be increased a predetermined time amount each time the query operation is performed and no HPLMN 104 is found. In other examples, the query timer value 128 may be doubled or increased a predetermined time amount when every third, fourth or other predetermined number of query operations is performed and no HPLMN 104 is found. These and other examples of increasing the query timer value 128 are considered to be within the scope of the present subject matter. At operation 218, the process 200 continues to operation 208.

Figure 3:
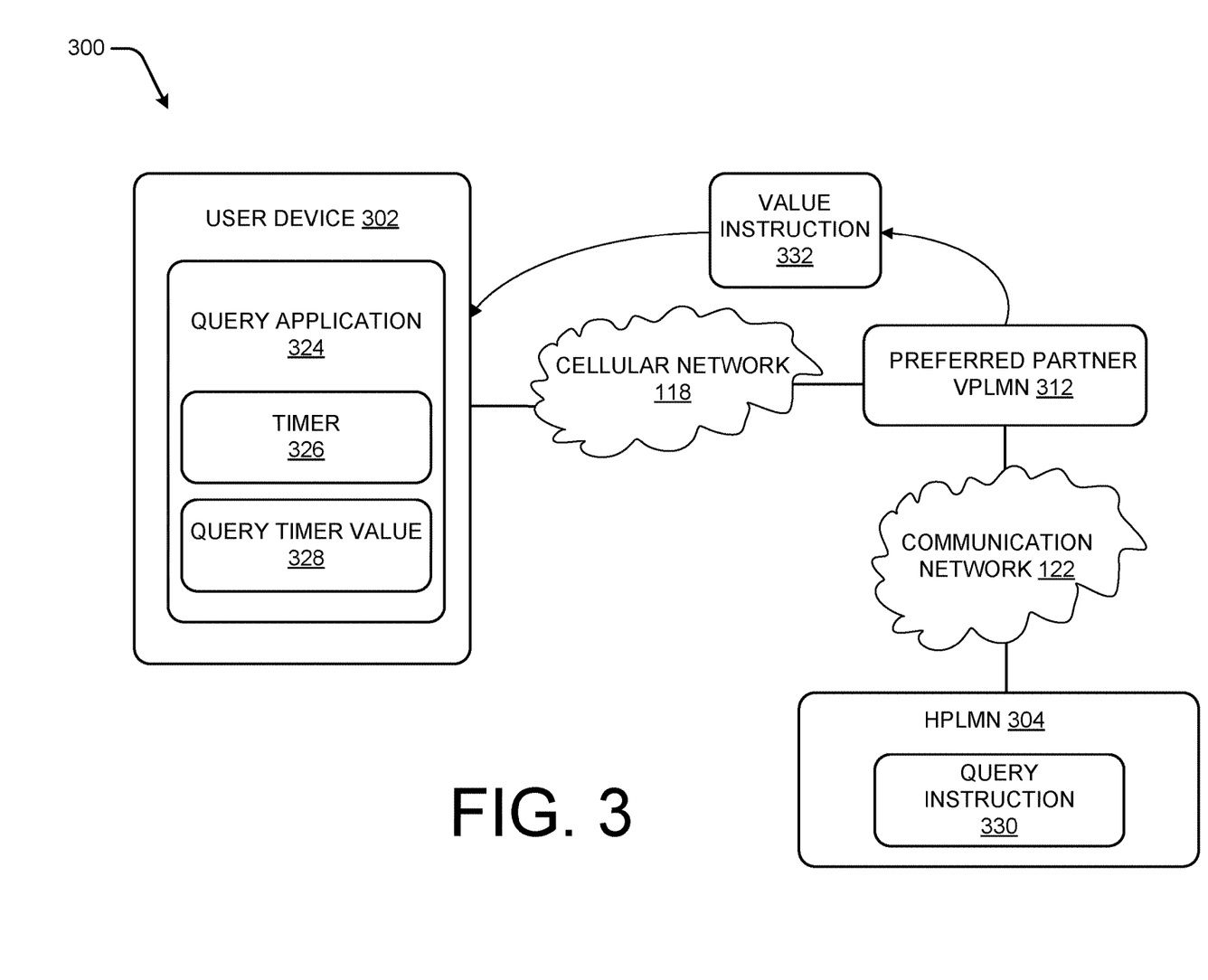
FIG. 3 illustrates an example operation environment for providing incremental querying for network coverage.

FIG. 3 illustrates an example operation environment 300 to provide incremental querying for network coverage, whereby a network transmits instructions to a user device to query for a home network. User device 302 may be a mobile device used by a user (not pictured), a computer, laptop, or the like. The user device 302 may be compatible with one or more types of communication networks, such as, but not limited to, Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN). In some examples, the communications networks described herein can include any network topologies including, but not limited to, 2G, 3G, 4G, 4G LTE, 5G, Wi-Fi, Bluetooth, Bluetooth Low Energy, and the like. In other examples, the communication network can be wired or wireless Internet Protocol-based networks capable of establishing communication with a communication services server.

In FIG. 3, the user device 302 is subscribed to a network operator (not shown) that owns or controls the HPLMN 304. If the user device 302 is not in an area covered by a cell tower controlled by the HPLMN 304, in order to provide service to a user operating the user device 302, the user device 302 may query and attach to a non-home PLMN. In the example illustrated in FIG. 3, a network that may be used by the user device 302 is a preferred partner VPLMN 312. Cellular network 118 is provided by preferred partner VPLMN 312. Communication between the preferred partner VPLMN 312 and the HPLMN 304 may be provided by the communication network 122.

In FIG. 3, the HPLMN 304 has entered into an agreement with the preferred partner VPLMN 312. In that instance, if the user device 302 is out of the network of the HPLMN 304 and the preferred partner VPLMN 312 is available, the user device 302 will preferably attach to the preferred partner VPLMN 312 over other, non-preferred partner VPLMNs.

In FIG. 3, the user device 302 may initiate a query application 324 that uses a timer 326 and advances a query timer value 328 when a query operation is conducted. However, in some examples, it may be beneficial to have the query timer value 328 be controlled by another entity, such as the HPLMN 304. For example, if the query timer value 328 is at a maximum value, but the HPLMN detects that the user device 302 is moving towards an area in which there is an increased probability that the HPLMN 304 may provide coverage, it may be desirable to provide for the ability of the HPLMN 304 to remotely adjust the query timer value 328. There may be other reasons that an entity, such as the HPLMN 304 may want to adjust the query timer value 328, and are considered to be within the scope of the presently disclosed subject matter.

When the HPLMN 304 determines that the query timer value 328 is to be adjusted, the HPLMN 304 may generate a query instruction 330. The query instruction 330 is used to provide over-the-air (OTA) programming for devices, such as the user device 302. OTA programming technologies are used by PLMNs to program devices remotely, i.e. over-the-air. The query instruction 330 is transmitted to the preferred partner VPLMN 312 using the communication network 122. The preferred partner VPLMN 312 receives the query instruction 330 from the HPLMN 304 and transmits a value instruction 332 to the query application 324 of the user device 302.

The value instruction 332 informs the query application 324 of the time or increment to increase or decrease the query timer value 328. For example, the HPLMN 304 may receive information that the user device 302 is approaching and near an area covered by the HPLMN, but, is not currently covered by the HPLMN 304. The HPLMN 304 may determine that there is a probability that the user device 302 will enter a coverage area in a short period of time. If the query timer value 328 is at a maximum or other relatively high value, the user device 302 may end up being within an area covered by the HPLMN 304 without switching to the HPLMN for an extended period of time because of the relatively high value of the query timer value 328.

Figure 4:
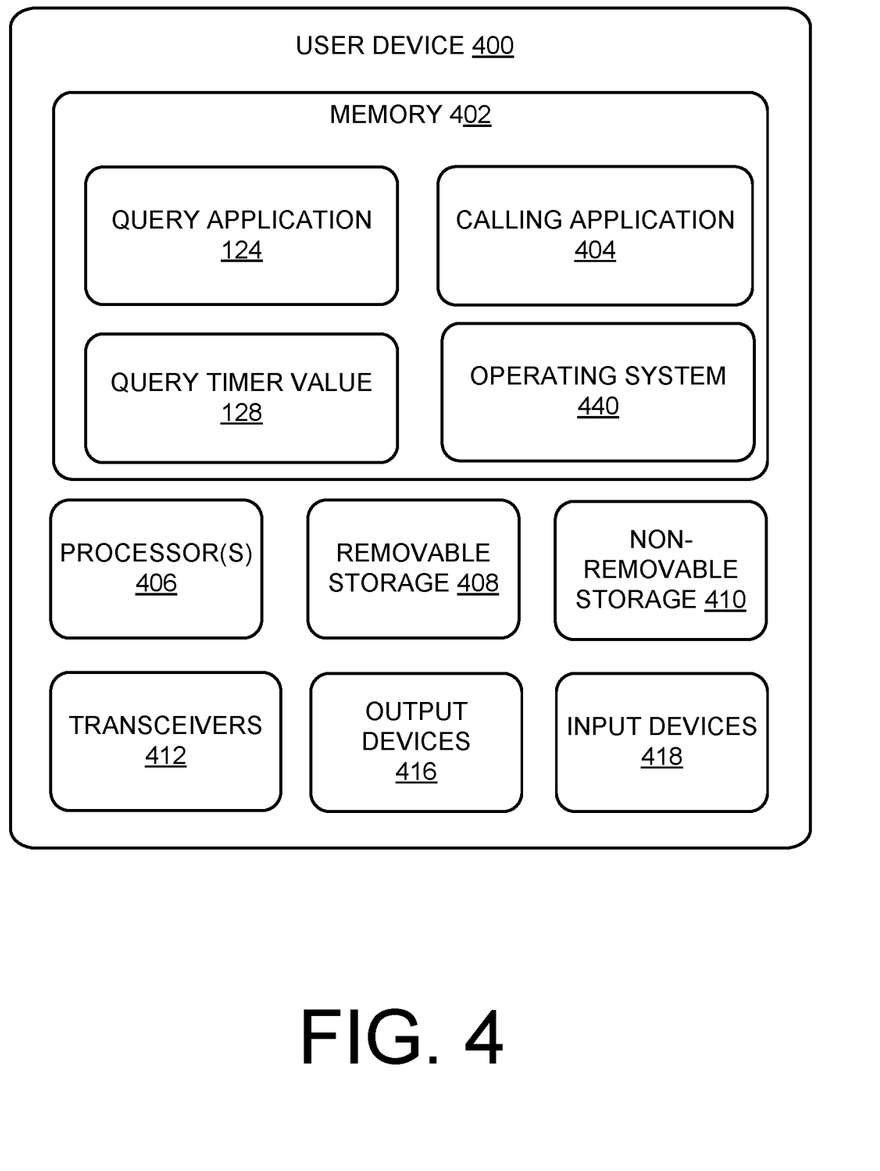
FIG. 4 illustrates a component level view of a user device configured for use within a wireless communication network.

FIG. 4 illustrates a component level view of a user device 400 configured to provide incremental querying for network coverage within a wireless communication network. As illustrated, the user device 400 comprises a system memory 402 that stores computer-executable instructions to implement a calling application 404. In some examples, the calling application 404 may be the software application used by the user device 400 to initiate and/or receive telephone calls between the user device 400 and a network, such as the cellular network 118, the cellular network 116, the cellular network 114, or a network controlled by the HPLMN 104. The system memory 402 also is storing computer-executable instructions to implement the query application 124. As noted above, the query application 124 is initiated by the user device 400 to query for the presence of various networks, such as a more preferred VPLMN or the HPLMN 104. The system memory 402 also is storing the query timer value 128. The system also is storing computer-executable instructions to implement the operating system 440. The operating system 440 is executed by processor(s) 406 and controls operational aspects of the user device 400, such as the query application 124, the query timer value 128, and the calling application 404.

The user device 400 includes the processor(s) 406, a removable storage 408, a non-removable storage 410, transceivers 412, output device(s) 416, and input device(s) 418. In various implementations, the system memory 402 is volatile (such as RAM), non-volatile (such as ROM, flash memory, etc.) or some combination of the two. In some implementations, the processor(s) 406 is a central processing unit (CPU), a graphics processing unit (GPU), or both CPU and GPU, or any other sort of processing unit.

The user device 400 may also include additional data storage devices (removable and/or non-removable) such as, for example, magnetic disks, optical disks, or tape. Such additional storage is illustrated in FIG. 4 by removable storage 408 and non-removable storage 410.

Non-transitory computer-readable media may include volatile and nonvolatile, removable and non-removable tangible, physical media implemented in technology for storage of information, such as computer readable instructions, data structures, program modules, or other data. System memory 402, removable storage 408 and non-removable storage 410 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the user device 400. Any such non-transitory computer-readable media may be part of the user device 400.

In some implementations, the transceivers 412 include any sort of transceivers known in the art. For example, the transceivers 412 may include wired communication components, such as an Ethernet port, for communicating with other networked devices. Also, or instead, the transceivers 412 may include wireless modem(s) to may facilitate wireless connectivity with other computing devices. Further, the transceivers 412 may include a radio transceiver that performs the function of transmitting and receiving radio frequency communications via an antenna.

In some implementations, the output devices 416 include any sort of output devices known in the art, such as a display (e.g. a liquid crystal display), speakers, a vibrating mechanism, or a tactile feedback mechanism. Output devices 416 also include ports for one or more peripheral devices, such as headphones, peripheral speakers, or a peripheral display.

In various implementations, input devices 418 include any sort of input devices known in the art. For example, input devices 418 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   entering a roaming mode for a user device, whereby the user device attaches to a visited public land mobile network (VPLMN);
   initiating a query application to determine if a more preferred VPLMN or a home public land mobile network (HPLMN) to which the user device is subscribed is available;
   determining that a more preferred VPLMN or a home public land mobile network (HPLMN) to which the user device is subscribed is not available;
   incrementing a query timer value used to determine a time between operations of the query application;
   determining that the user device has moved less than a predetermined distance within a predetermined period of time; and
   in response to determining that the user device has moved less than the predetermined distance, increasing the query timer value.

2. The method of claim 1, further comprising:
   determining that the query timer value is at a maximum value; and
   ceasing the incrementing of the query timer value so that the query timer value remains at the maximum value for a subsequent query operation.

3. The method of claim 1, further comprising:
   determining that the HPLMN is available;
   attaching the user device to the HPLMN; and
   resetting the query timer value to a reset value.

4. The method of claim 1, further comprising:
   determining that the user device has moved more than the predetermined distance within a second predetermined period of time; and
   decreasing the query timer value.

5. The method of claim 1, further comprising:
   determining that the more preferred VPLMN is available;
   attaching the user device to the more preferred VPLMN; and
   resetting the query timer value to a reset value, the reset value being between an original value and a maximum value.

6. The method of claim 1, further comprising:
   determining that the user device has lost coverage with the VPLMN; and
   resetting the query timer value to a reset value.

7. The method of claim 1, further comprising:
   receiving a value instruction generated by the HPLMN; and
   based on receiving the value instruction, resetting the query timer value.

8. A non-transitory computer-readable storage medium having computer-executable instructions stored thereupon that, when executed by a computer, cause the computer to:
   enter a roaming mode for a user device, whereby the user device attaches to a visited public land mobile network (VPLMN);
   initiate a query application to determine if a more preferred VPLMN or a home public land mobile network (HPLMN) to which the user device is subscribed is available;
   determine that a more preferred VPLMN or a home public land mobile network (HPLMN) to which the user device is subscribed is not available;
   increment a query timer value used to determine a time between operations of the query application;
   determine that the user device has moved more than a predetermined distance within a predetermined period of time; and
   in response to determining that the user device has moved more than the predetermined distance, decrease the query timer value.

9. The non-transitory computer-readable storage medium of claim 8, further comprising computer-executable instructions that, when executed by the computer, cause the computer to:
   determine that the query timer value is at a maximum value; and
   cease incrementing the query timer value so that the query timer value remains at the maximum value for subsequent query operations.

10. The non-transitory computer-readable storage medium of claim 8, further comprising computer-executable instructions that, when executed by the computer, cause the computer to:
    determine that the HPLMN is available;
    attach the user device to the HPLMN; and
    reset the query timer value to a reset value.

11. The non-transitory computer-readable storage medium of claim 8, further comprising computer-executable instructions that, when executed by the computer, cause the computer to:
    determine that the user device has moved less than the predetermined distance within a second predetermined period of time; and
    increase the query timer value.

12. The non-transitory computer-readable storage medium of claim 8, further comprising computer-executable instructions that, when executed by the computer, cause the computer to:
    determine that the more preferred VPLMN is available;
    attach the user device to the more preferred VPLMN; and
    reset the query timer value to a reset value, the reset value being between an original value and a maximum value.

13. The non-transitory computer-readable storage medium of claim 8, further comprising computer-executable instructions that, when executed by the computer, cause the computer to:
receive a value instruction generated by an entity; and
based on receiving the value instruction, reset the query timer value.

14. The non-transitory computer-readable storage medium of claim 13, wherein the entity is the HPLMN.

15. A system comprising:
a non-transitory storage medium; and
instructions stored in the non-transitory storage medium, the instructions being executable by the system to:
enter a roaming mode for a user device, whereby the user device attaches to a visited public land mobile network (VPLMN);
initiate a query application to determine if a more preferred VPLMN or a home public land mobile network (HPLMN) to which the user device is subscribed is available;
determine that a more preferred VPLMN or a home public land mobile network (HPLMN) to which the user device is subscribed is not available;
increment a query timer value used to determine a time between operations of the query application;
determine whether the user device has moved more than a predetermined distance within a predetermined period of time;
in response to determining that the user device has moved more than the predetermined distance, decrease the query timer value; and
in response to determining that the user device has moved less than the predetermined distance, increase the query timer value.

16. The system of claim 15, further comprising instructions that, when executed by the system, cause the system to:
determine that the query timer value is at a maximum value; and
cease incrementing the query timer value so that the query timer value remains at the maximum value for subsequent query operations.

17. The system of claim 15, further comprising instructions that, when executed by the system, cause the system to:
determine that the HPLMN is available;
attach the user device to the HPLMN; and
reset the query timer value to a reset value, the reset value comprising a default value, or a value between an original value and a maximum value.

18. The system of claim 15, further comprising instructions that, when executed by the system, cause the system to:
determine that the more preferred VPLMN is available;
attach the user device to the more preferred VPLMN; and
reset the query timer value to a reset value, the reset value being between an original value and a maximum value.

* * * * *